Aug. 6, 1940.  W. LINTERN ET AL  2,210,592
VEHICLE BODY VENTILATOR
Original Filed Jan. 20, 1933   2 Sheets-Sheet 1
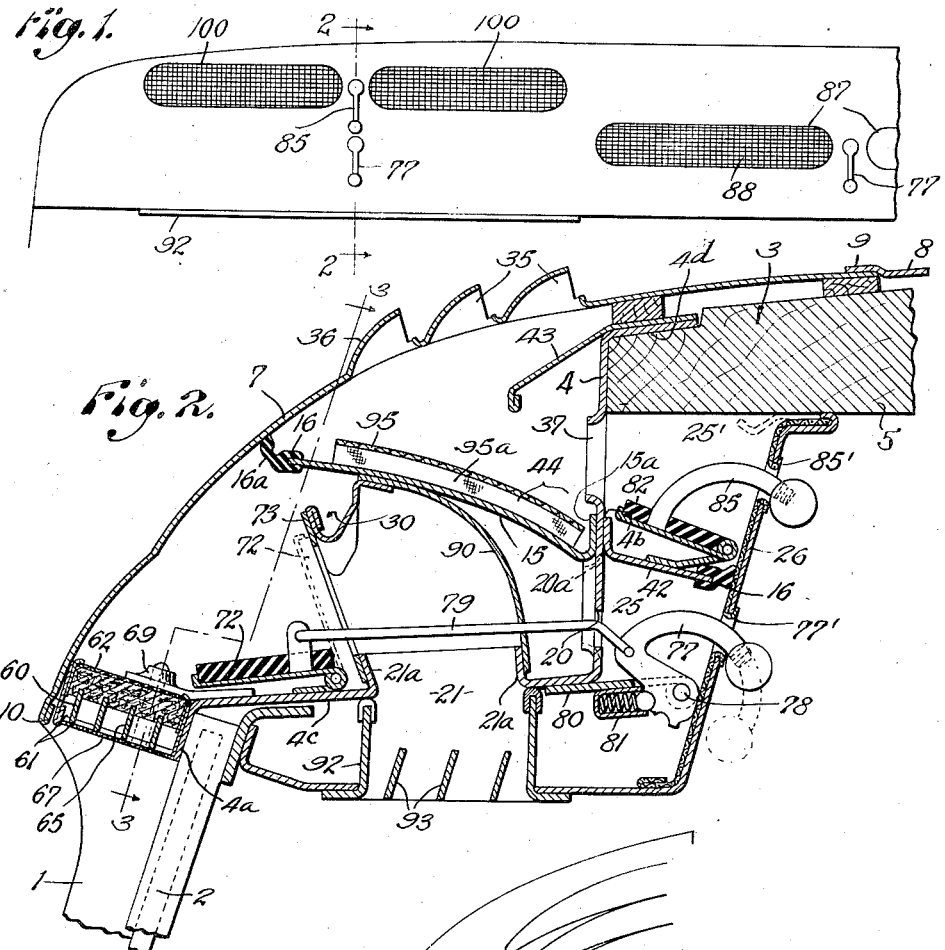
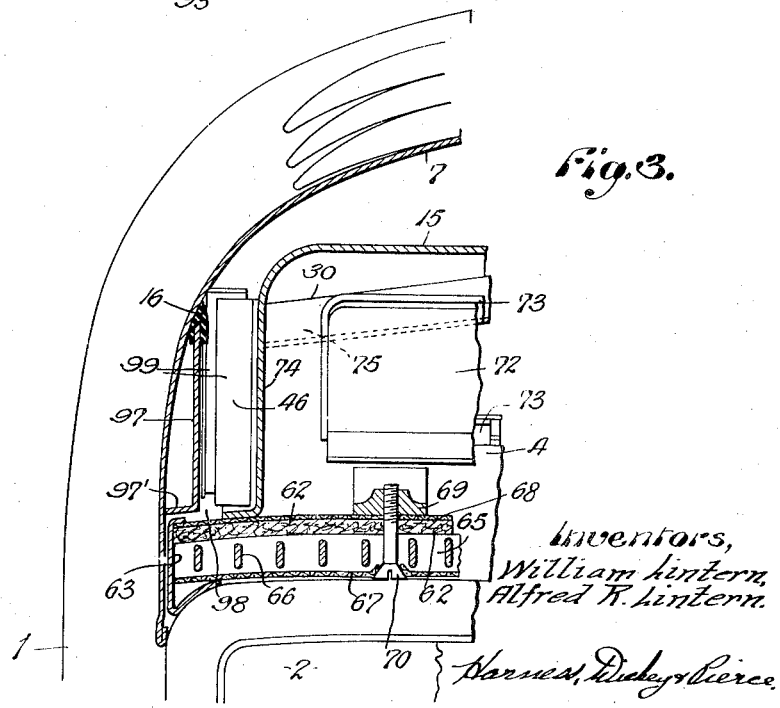
Inventors,
William Lintern,
Alfred K. Lintern
Harness, Dickey & Pierce Aug. 6, 1940.  W. LINTERN ET AL  2,210,592
VEHICLE BODY VENTILATOR
Original Filed Jan. 20, 1933    2 Sheets-Sheet 2

Inventors,
William Lintern,
Alfred R. Lintern.
Harness, Dickey & Pierce.

Patented Aug. 6, 1940

2,210,592

UNITED STATES PATENT OFFICE 2,210,592

VEHICLE BODY VENTILATOR

William Lintern and Alfred R. Lintern, Cleveland, Ohio, assignors, by mesne assignments, to Evans Products Company, Detroit, Mich.

Original application January 20, 1933, Serial No. 652,624. Divided and this application April 6, 1936, Serial No. 72,986

1 Claim. (Cl. 98—2)

This invention relates to vehicle body ventilating apparatus of the type shown in our prior application, Serial No. 578,710, filed December 3, 1931, Patent No. 1,969,934. The apparatus also includes principles of operation and apparatus which are disclosed and claimed in the patent to William Lintern, No. 1,862,058, issued June 7, 1932, and is a division of our co-pending application Serial No. 652,624, filed January 20, 1933, and to be issued as United States Patent No. 2,036,485 on April 7, 1936.

The objects include the following:

1. To simplify and reduce the cost of construction and installation of efficient all-weather injector and/or ejector ventilator apparatus for vehicle bodies, particularly of the closed type.

2. To provide a ventilating unit for a vehicle body which may be more economically installed, particularly as a "built-in" feature of the body.

3. To provide a simple and effective injector and/or ejector ventilator apparatus which will occupy a comparatively small space and more effectively employ parts of the body which are essential to the body construction as parts of the ventilator apparatus.

4. To provide an air injector which will function to supply air to the interior of a vehicle body in large volume and which will not detract in any way from the pleasing appearance of such body. 4—a. More specifically, to provide an air injector arrangement which will be relatively inconspicuous upon casual observation of the body. 4—b. Still more specifically, to provide an inconspicuous and efficient air injector for a vehicle body which is highly "stream-lined."

5. To provide improved weatherproofing means for injector and/or ejector ventilators for vehicle bodies.

6. To provide more effective arrangements for draining water from injector and/or ejector ventilators.

7. Provision of an efficient injector and/or ejector ventilator, the parts of which may be easily and quickly assembled and installed in a vehicle body without materially altering or weakening the construction of such body.

8. To more effectively use essential parts of an automobile body structure in the provision of an injector and/or ejector ventilator apparatus.

9. To provide an effective ventilator arrangement for a vehicle body of the closed type which arrangement will be substantially entirely contained in the header structure of the body without increasing or unduly increasing the size of or weakening such structure.

In the drawings, in which like numerals are used to designate like parts in the several views throughout:

Figure 1 is a fragmentary view showing substantially half of the front header panel of an automobile body and the relative positions of the injector and ejector openings therethrough;

Fig. 2 is a fragmentary sectional view taken along the line 2—2 of Fig. 1 longitudinally of the vehicle body, showing the upper and forward portion of an automobile body incorporating one form of the invention;

Fig. 3 is a detailed transverse sectional view taken substantially along the line 3—3 of Fig. 2;

Figure 4:
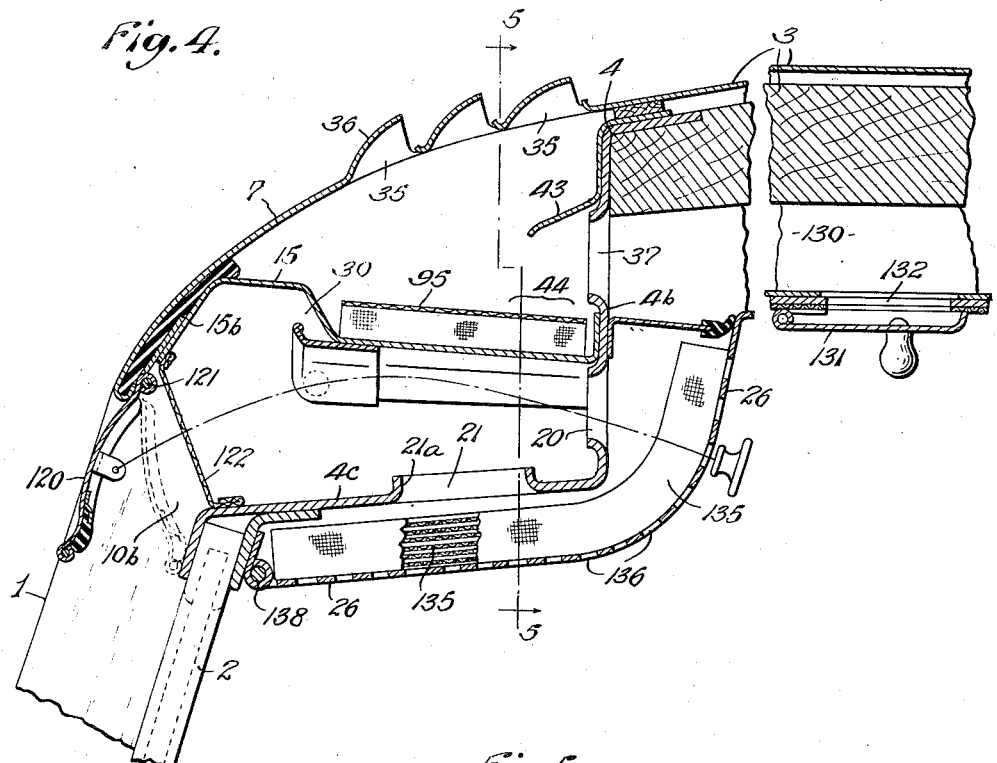
Fig. 4 is a view similar to Fig. 2, showing a modified form of the present invention.

Referring in detail to the drawings, I indicates the portion of the body front wall which forms the upright outer windshield frame. These are the usual forward vehicle body side frame posts. The windshield is shown in position between the posts 1 at 2. The roof or top wall structure of the body is shown generally at 3 and joining the roof structure and front wall framework, there is a hollow header structure including a header member 4 adapted to be made from pressed steel. The header member 4 connects a transverse wooden header member 5—usually present as part of the roof structure—with the front frame posts 1 in conventional fashion. The header member 4 is comparatively rigid by reason of various flanges thereon there being a substantially vertical portion 4b and substantially horizontal portion 4c and in addition a downwardly extending flange 4a behind the windshield and a rearwardly extending flange 4d at the upper margin of the portion 4b. The header member 4 may be made an essential portion of the ventilator as in the embodiments shown in all figures hereof. The ends of the header may curve downwardly at the body sides and may be suitably rigidly secured to the side posts.

Additionally connecting the front wall structure with the roof structure 3 and forming an outer wall of the hollow header structure there is an outer header member 7. This, it is understood, is referred to in automobile body building as the top roof panel. The panel 7 overhangs the upper margin of the windshield and extends rearwardly over the windshield and the rearwardly extending portion has air inlet passages 10 communicating the interior of the hollow header with the outside air. The outer and forwardly facing surface of the panel as shown in Fig. 1 lies in the plane defined by the foremost surfaces of the side frame posts and curves upwardly and rearwardly, the rear margin of the panel 7 resting on and being suitably secured to the roof structure. For example, the panel 7 may overlie and rest on the wooden header 5 and be suitably joined to a top cover member 8 as at 9.

It will be noted that by reason of the windshield being set back of the foremost surface of the side frame posts 1 (a distance substantially equal to the effective width—narrow dimensions—of the openings 10, as shown) a very definite air stream guiding channel is formed between the windshield and side frame posts 1 which channel empties air upwardly directly into the injector openings. Thus the injector requires no conspicuous deflector such as prehensile lip or scoop protruding from the body forwardly.

The upper wall of the injector duct is formed by a sheet metal member 15 which divides the injector duct from the ejector duct portions of the header structure. This member 15 will be hereinafter referred to, in connection with all forms shown, as a divider. The divider may be secured as by a flange 15a to the vertical portion 4b of the header member 4, and is provided at its forward and upward edges with suitable sealing material such as an extruded sponge rubber strip 16 having body portions formed to embrace both edges of the divider and a flexible rib 16a adapted to yieldingly bridge the gap between the divider and the top roof panel 7 and form an effective seal to isolate the injector duct from the ejector duct.

At the vertical and horizontally disposed portions of the header are air passage openings 20 and 21, preferably strengthened by flanging the metal inwardly as at 20a and 21a, continuously about each opening. These openings as shown are arranged in common vertical planes—longitudinally of the vehicle body—so that part of the air received into the duct above described is diverted rearwardly through the header 4 and part downwardly therethrough.

During bad weather, moisture is carried through the inlet passages 10 and under such condition the door 72 is either partly or completely closed. The suspended moisture carried by the air is thrown upwardly and forwardly as it strikes the door 72 against the top roof panel and any substantial amount of moisture remaining is thrown against the wall 15 which, in turn, deflects the air containing such moisture into the trough 30. The moisture collecting on the front roof panel readily drains to the forward part of the injector opening 10. Such moisture as may collect on the forwardly facing surface of the divider 15 would tend to drain downwardly and rearwardly (being urged by incoming air) and to prevent such drainage the collected moisture may be carried along the duct—laterally of the vehicle body—by suitable trough effects (see 30) on the divider 15. These may comprise suitably formed strips of sheet metal rigidly secured to the underside of the divider 15 and inclining downwardly both ways from vertical planes cutting the openings 10 centrally thereof, or the trough effect may be continuous and coextensive with the divider 15 for lateral discharge of accumulated moisture into the main drain ducts (46, Fig. 2) disposed at the sides of the header structure as will be hereinafter shown.

An air filtering and windnoise reducing medium is illustrated at the entrance passage 10 to the injector. Further, the control arrangement for the injector is so constructed that air may be selectively diverted downwardly and rearwardly in the car by the use of the injector, there being separate controls for these two operations.

The air treating arrangement of Fig. 2 comprises an air filtering unit 60, disposed within the passage 10, including a sheet metal grill structure 61 and body 62 of air filtering material supported thereby. The grill and body of filtering material may be contained by a suitable shell 63—say sheet metal. The grill may comprise spaced strips of sheet metal indicated at 65 extending laterally of the vehicle body and perforated to snugly receive short sheet metal bars 66, see Fig. 3.

The body of air filtering material may comprise metal wool and this may be suitably treated as by oiling to enable the same to collect dust, e. g. from the air. The grill structure is preferably protected at the injector opening against entrance of large foreign matter into the spaces between the sheet metal strips and bars—note screen at 67—and the body 62 may be held in position by a suitable screen at 68, both screens being maintained in position by the sheet metal outer frame 63.

The unit 60 may be removably supported in the injector opening or openings on suitable brackets 69 supported on the generally horizontal and forward portion of the header member 4, and, as shown, the unit 60 is perforated to receive attaching screws 70 which pass through the unit and are in suitably threaded connection with the brackets 69.

A controlling injector duct closure device is provided between the outer and inner ends of the injector ducts. This controlling closure as shown comprises a suitable number of doors or shutters 72 (one only being shown) hinged to the generally horizontal portion of the header 4 and arranged to swing from the open position shown in Fig. 2 to a closed position, (shown in broken lines) across an open framework 73. As shown this framework is supported at its lower edge by the forward flanges 21a of the header openings 20 and at its upper edge by the trough arrangement 30. The trough arrangement (see Fig. 3) discharges near the side portions of the body top structure and the ends of the trough are inclined downwardly to discharge through the end walls 74 of the injector duct, at suitable openings 75 into the drain ducts 46.

It is desirable that the controls for both the injector and ejector apparatus be located on the upright portion of the front header panel. A suitable arrangement for this is shown particularly in Figs. 1 and 2, wherein it will be seen that the injector control doors or shutters are positioned by individual bent lever arms 77 carried on individual shafts 78 and connected to the doors or shutters through suitable linkage 79. The lever arm shafts 78 may be carried on suitable brackets 80 supported on the header member 4 and the levers may be held in various positions by suitable detents, such as the conventional spring and ball devices, one being shown at 81, Fig. 2, suspended from the bracket 80. The ejector doors or shutters 82 are as shown hinged to the divider 42. Curved arms are provided as at 85 for the ejector doors or shutters and both the arms 77 and 85 may project through suitable respective openings 77' and 85' in the front header panel and both sets of arms may have suitable knobs.

As set forth in the above identified Lintern patent and pending application, the air under high pressure rising frm the windshield and front wall of the body generally, including the forwardly facing portion of the top roof panel 7, creates an exceedingly low air pressure area behind the effective upper limit of such front wall. Thus the mere provision of suitable openings in the forward portion of the top wall and suitable air ducts to the body space provide an excellent air ejector to maintain circulation of air in the body in conjunction with the injector above described and to rapidly exhaust foul air from the body. Such suitable ejector openings are shown at 35 in the top roof panel and these are preferably guarded by decorative louvers 36. The louvers guard the ejector duct against receiving larger pieces of foreign matter from the air. The assistance rendered by the louvers in the air ejecting action is believed inconsiderable as experience has demonstrated that the openings without louvers appear to be more effective in ejecting air in large volume.

The lower wall of the ejector duct is formed by the divider 15 previously described and the end walls are formed by continuations of the end walls upwardly past the divider 15 to the top roof panel. The ejector openings in the header are illustrated at 37.

A further refinement of the ejector includes the provision of a splash screen 95 shown as an inverted channel of suitable metal screen with vertical portions 95a resting on the divider 15 thus holding the main body of the screen in spaced relation to the divider. During storms a considerable volume of water may be received through the ejector openings 35 and such water will be prevented from splashing through the ejector openings 37 in the header member 4 by being caught by the screening.

Water collected in the ejector duct forwardly of the header member 4 is conveyed laterally of the vehicle body in the trough effect 44 and discharges into the downwardly extending drain ducts 46 at the sides of the body. These ducts (only one being shown) are formed by the walls 74 previously referred to and vertical wall members 97 secured to the header as by suitable flanges 97'. The duct effects thus formed discharge water through end portions of the unit 60 as at 98. To prevent these drain passages from operating as injectors and thus decreasing the effect of the ejector by supplying the ejector duct directly with injected air, a suitable arrangement of baffles 99 may be provided in each drain duct. These may overlap each other from opposite sides of the drain duct so as to form considerable resistance to the passage of air through the drain duct while allowing comparatively free discharge of water to the end portions of the injector opening.

Referring again to the injector duct it will be seen that in Fig. 1 provision is made whereby substantially the entire supply of air from say the central one of three door frames 73, which air is passed through openings 20 (see Fig. 2) in the header member 4, may be diverted rearwardly through suitable openings such as 87 in the front header panel while the supply from the extreme frames 73, which air is passed through the header openings 21 (Fig. 2) may be diverted downwardly forwardly of the front seat passengers. The inner surfaces of the front header panel may support suitable screen or grillwork such as shown at 88 to allow free passage of air through the front header panel while concealing the inner parts of the ventilator. Control of the direction of air flow from the extreme frames 73 downwardly may be accomplished by the provision of respective deflecting walls at 90 secured to the dividing wall 15 at its upper edge and to the generally horizontal portion of the header 4 at its lower edge. Such deflector is omitted opposite the openings 87 and the duct is suitably partitioned by transverse walls to prevent flow of air from the extreme frames 73 to the openings 87 and from the intermediate frame 73 to the openings 100. As shown in Fig. 2, the lower edge of the deflector 90 is secured to the rear flange 21a defining the openings 21 through the horizontal portion of the header 4.

Suitably secured in registration with the openings 21, are vertical tubes 92 (one being shown) which may be suitably carried on the horizontal portion of the front header panel and which may carry therewithin adjustable deflectors 93 to control the direction of air downwardly into the body. The deflectors may be interconnected in any suitable fashion so that all of the deflectors swing together in the manner of the shutters of a hot air register in a building.

Figure 5:
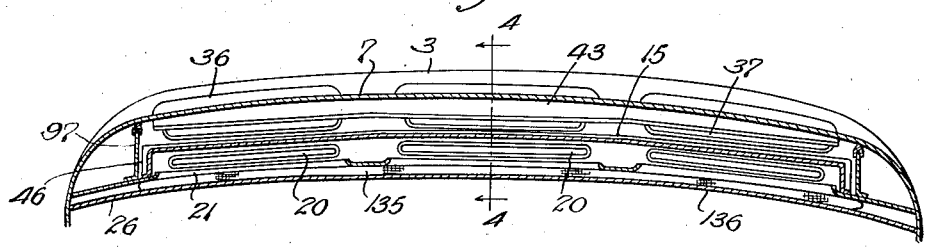
Fig. 5 is a sectional view taken transversely along the line 5—5 of Fig. 4.

Attention is called to the relative position of the injector discharge passages through the front header panel 26 and the ejector inlet openings, those at one end of the panel being indicated at 100 in Fig. 5. By this arrangement the air within the body is changed quickly with practically no possibility that air will merely travel from the opening 88 directly to the openings 100 without aerating the vehicle body. The air injected at the openings 87 is forced rearwardly into the body space centrally thereof and diffuses into the rear passenger space and finally the used air is carried along the ceiling at both sides directly to the respective sets of ejector openings 100. The air received through the openings 21 and tubes 92 is forced rapidly downwardly in the vehicle body forwardly of the front seat passengers to the cowl space and then diffuses and flows rearwardly in the body, finally rising and being drawn into the general air-flow toward the ejector openings and thereby ejected.

Referring now to Fig. 4 this illustrates another general arrangement of air treatment by suitable media but particularly for diffusing the injected air so as to substantially eliminate all unpleasant drafts which might be present with all the injector control doors or shutters open at the same time. Other portions of the ventilator shown in Fig. 4 are somewhat modified. For example the control doors or shutters (one being shown) are mounted exteriorly of the injector opening 10b. As shown, these doors 120 are hinged as at 121 to a depending flange portion 15b of the divider 15 and the doors swing into spaced relation to the windshield framework as shown in full lines in Fig. 4 to provide for positively deflecting large quantities of air into the injector duct. Suitable guarding screening may be positioned over the injector opening at 122.

The ejector is also modified to the extent that there is shown diagrammatically an ejector duct 130 in the ceiling of the car. It may be understood that this duct may extend any desirable distance along the ceiling and that the duct may either be built into the ceiling structure or formed separately therefrom on the inside of the body. A suitable control for such duct may comprise adjustable doors 131 positioned to close and adjustably regulate suitable openings 132 in the duct. Assuming several of such doors, the air may be ejected from the body at a number of points with relation to the body space generally as may be desired.

The draft diffusing device comprises, as shown, a reticulated air diffusing body 135 of substantial thickness. This may comprise loosely laminated screens lying within the space 25 between the front header panel 26 and the header member 4. The front header panel 26 may be perforated or otherwise provided with a suitable arrangement of openings as at 136 to allow air received by the injector and passed through the diffusing body to enter the interior of the vehicle body.

To facilitate positioning of the air diffusing body 135 the front header panel may be hinged as at 138 adjacent the upper windshield frame and at its upper edge this panel may be secured in any suitable fashion as by screws to the header structure generally. The manner of securing such upper edge of the header panel is not illustrated in Fig. 4, but this may be, for example, as shown in Fig. 2.

Figure 6:
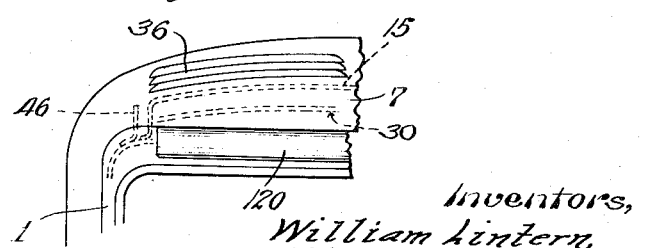
Fig. 6 is a fragmentary front elevation of the upper portion of an automobile body incorporating the arrangements of Figs. 4 and 5.

Fig. 5 shows a desirable disposition of openings through the header and also shows a suitable drain duct arrangement. It will be observed in Fig. 6 that the drain duct 46 is out of alignment with the extreme side edge of the door 120 illustrated wherefore this drain duct is out of the free passage for air through the injector tube and will thus not be likely to receive any large volume of injected air.

It is to be understood that all the metal parts of the construction herein described which may come in contact with moist air or water may be of inherently non-corrosive metal or may be suitably rust proofed by any known or suitable methods. Such parts, for example, may be rustproofed or suitably coated with waterproof paint or enamel.

It will be understood that the embodiments herein shown may be modified within the scope of the present invention and formal changes may be made in the specific embodiments disclosed, the scope of which is commensurate with the appended claim. The parent patent above mentioned may be referred to for a more complete and detailed description of the manner in which the structure here claimed may be corelated with other parts of a vehicle body with which the structure here disclosed and claimed is intended to be used. Also, such parent patent may be referred to as it illustrates and describes other embodiments of the invention and illustrates manners in which the present invention may be modified within the scope of the present invention.

Having thus described our invention, we claim:

In a vehicle body, a front vehicle body wall and a top vehicle body wall, an outer cover panel substantially bridging said walls, an ejector outlet passage in said outer panel, a header member connecting the top wall with the front wall and disposed inwardly from said panel in spaced relation thereto to form part of an ejector duct, and opening in said header member for conveying air from the interior of the body to said duct, bottom and side wall members completing said duct, said bottom wall member being operably connected at its forward edge with said outer panel and at its rearward edge with the header member, reticulated means disposed in spaced relation to said bottom wall member beneath said ejector passage and forwardly from said header opening to prevent water received at the ejector passage from being splashed through said opening in the header member, and means to drain water from said bottom wall.

WILLIAM LINTERN.
ALFRED R. LINTERN.